(12) United States Patent
Cheong et al.

(10) Patent No.: US 9,870,113 B2
(45) Date of Patent: Jan. 16, 2018

(54) CAPACITIVE DISCHARGE CIRCUIT FOR TOUCH SENSITIVE SCREEN

(71) Applicant: STMicroelectronics Asia Pacific Pte Ltd, Singapore (SG)

(72) Inventors: Chee Weng Cheong, Singapore (SG); Dianbo Guo, Singapore (SG); Kien Beng Tan, Singapore (SG); Yannick Guedon, Singapore (SG)

(73) Assignee: STMicroelectronics Asia Pacific Pte Ltd, Singapore (SG)

( * ) Notice: Subject to any disclaimer, the term of this patent is extended or adjusted under 35 U.S.C. 154(b) by 0 days.

(21) Appl. No.: 15/679,771

(22) Filed: Aug. 17, 2017

(65) Prior Publication Data

US 2017/0344158 A1  Nov. 30, 2017

Related U.S. Application Data

(62) Division of application No. 14/531,631, filed on Nov. 3, 2014.

(51) Int. Cl.
*G06F 3/044* (2006.01)
*G06F 3/041* (2006.01)

(52) U.S. Cl.
CPC ............. *G06F 3/044* (2013.01); *G06F 3/041* (2013.01); *G06F 3/0418* (2013.01)

(58) Field of Classification Search
CPC ................................................... G09G 3/0418
See application file for complete search history.

(56) References Cited

U.S. PATENT DOCUMENTS

| 5,861,583 | A | 1/1999 | Schediwy et al. |
| 8,446,158 | B1 | 5/2013 | Jansson |
| 9,665,215 | B2 * | 5/2017 | Tan .......................... G06F 3/044 |
| 2010/0060608 | A1 * | 3/2010 | Yousefpor ............. G06F 3/0418 345/174 |
| 2010/0245286 | A1 * | 9/2010 | Parker ................... G06F 3/0416 345/174 |
| 2011/0261006 | A1 * | 10/2011 | Joharapurkar ........ G06F 3/0416 345/174 |
| 2013/0069672 | A1 * | 3/2013 | Pedersen ................ G01R 27/26 324/679 |
| 2014/0078096 | A1 * | 3/2014 | Tan ..................... G01R 27/2605 345/174 |
| 2014/0292705 | A1 | 10/2014 | Tan et al. |

* cited by examiner

*Primary Examiner* — Priyank Shah
(74) *Attorney, Agent, or Firm* — Gardere Wynne Sewell LLP

(57) ABSTRACT

A capacitive discharge circuit includes a line having a capacitance, a switched capacitor circuit including a capacitor, a switched circuit coupled to the line, and a voltage regulator coupled between the switched capacitor circuit and the switched circuit. A controller operates the switched capacitor circuit and switched circuit to in a first phase, charge the capacitor by coupling the capacitor between a common mode and a power supply, and in a second phase, discharge the capacitor by coupling the voltage regulator in series with the capacitor between the power supply node a ground. The controller is also configured to in a third phase, charge the capacitor by coupling the capacitor between the common mode and the power supply, and in a fourth phase, share charge between the line and the capacitor by coupling the voltage regulator and the capacitor in series between the line and the ground.

14 Claims, 5 Drawing Sheets

CAPACITIVE DISCHARGE CIRCUIT FOR TOUCH SENSITIVE SCREEN

CROSS REFERENCE TO RELATED APPLICATION

This application is a divisional from U.S. patent application Ser. No. 14/531,631 filed Nov. 3, 2014, the disclosure of which is incorporated by reference.

TECHNICAL FIELD

This disclosure is related to the field of discharging capacitances and, more particularly, to the field of discharging parasitic capacitances associated with touch sensitive screens.

BACKGROUND

Handheld electronic devices, such as tablets and smartphones, are widely used in the world at the present time. Such handheld electronic devices are now capable of performing most of the same functions as a laptop or desktop computer, and as such, the software they execute is growing in complexity. In addition, most such devices utilize a touch sensitive screen as the main input device, and the software currently employed may utilize complex gestures made on the screen, in addition to taps and swipes, as input commands.

Since accuracy in recognizing these inputs is desirable, it is helpful to maximize the dynamic range and sensitivity of the touch sensitive screens. To this end, it is useful to discharge the parasitic capacitances in the circuitry of the touch sensitive screens. While methods of discharging such parasitic capacitances are known, such methods involve the use of transistors that source current, and thus suffer from the flicker noise inherent to transistors performing that function.

Therefore, new methods of discharging the parasitic capacitances of touch screens are desired.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In accordance with this disclosure, a capacitive discharge circuit may include a line having a capacitance associated therewith, and a switched capacitor circuit comprising a capacitor. In addition, a switched circuit may be coupled to the line, and a voltage regulator circuit may be coupled between the switched capacitor circuit and the switched circuit. Furthermore, a controller may be configured to operate the switched capacitor circuit and the switched circuit. The controller may be operated to, in a first phase, charge the capacitor by coupling the capacitor between a common mode node and a power supply node. The controller may additionally be operated to, in a second phase, discharge the capacitor by coupling the voltage regulator circuit in series with the capacitor between the power supply node and a ground node. The controller may also be operated to, in a third phase, charge the capacitor by coupling the capacitor between the common mode node and the power supply node. The controller may be further operated to, in a fourth phase, share charge between the line and the capacitor by coupling the voltage regulator circuit and the capacitor in series between the line and the ground node.

Another aspect is directed to electronic device. The electronic device may include a touch sensitive display, and an input line coupled to the touch sensitive display. The electronic device may also include a voltage regulator circuit, and a capacitor having first and second terminals. A first switch circuit may have inputs coupled to the voltage regulator circuit and to a common mode node, and an output coupled to the first terminal of the capacitor. A second switch circuit may have inputs coupled to a power supply node and to a ground node, and an output coupled to the second terminal of the capacitor. A third switch circuit may have inputs coupled to the input line and to the power supply node, and an output coupled to the voltage regulator circuit.

A method aspect is directed to a method of discharging a capacitance on a line. The method may include in a first phase, charge a capacitor by coupling the capacitor between a common mode node and a power supply node. In a second phase, the capacitor may be discharged by coupling a voltage regulator circuit in series with the capacitor between the power supply node and a ground node. In a third phase, the capacitor may be charged by coupling the capacitor between the common mode node and the power supply node. In a fourth phase, charge may be shared between the line and the capacitor by coupling the voltage regulator circuit and capacitor in series between the line and the ground node.

DETAILED DESCRIPTION

One or more embodiments of the present disclosure will be described below. These described embodiments are only examples of the presently disclosed techniques. Additionally, in an effort to provide a concise description, all features of an actual implementation may not be described in the specification. It should be appreciated that in the development of any such actual implementation, as in any engineering or design project, numerous implementation-specific decisions may be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements.

Figure 1:
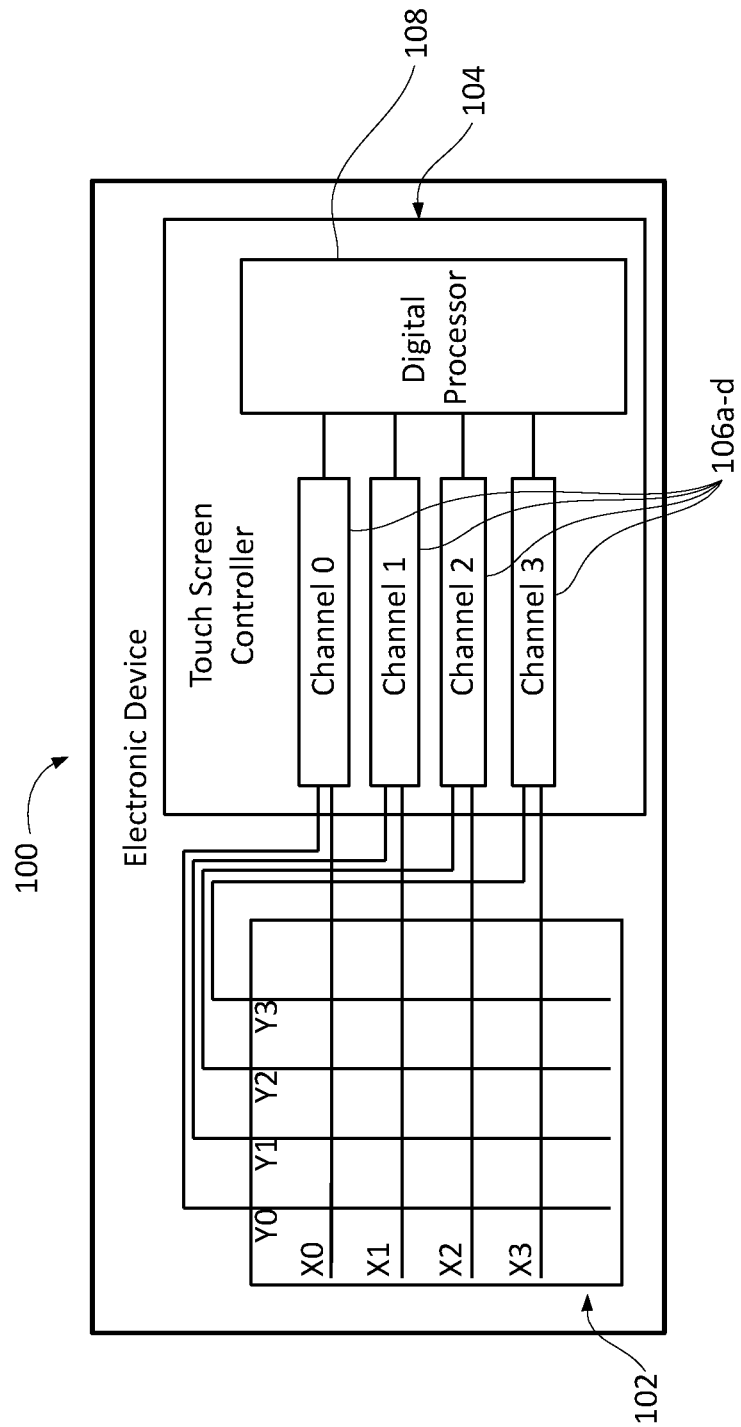
FIG. 1 is a schematic block diagram of an electronic device in accordance with this disclosure.

With reference initially to FIG. 1, an electronic device 100 is now described. The electronic device 100 may be any sort of electronic device, such as smartphone, tablet, or smartwatch, for example. The electronic device 100 includes a touch sensitive screen 102 that utilizes capacitive sensing to detect an object, such as a finger or stylus, in contact (or in proximate contact, i.e. hovering) therewith. As will be understood by those skilled in the art, the touch sensitive screen 102 includes a capacitive sensing layer for the aforementioned sensing, and that layer includes a plurality of intersecting sensing lines, illustratively the X0-X3 lines and the Y0-Y3 lines. The various lines X0-X3, Y0-Y3 are respectively coupled to sensing channels 106a-d of a touch screen controller 104. The touch screen controller 104 includes a digital processor 108 coupled to the sensing channels 106a-d, which uses the capacitance detected by the channels 106a-d between the object and the various lines X0-X3, Y0-Y3 to ultimately determine the position of the object on the touch sensitive screen 102.

Figure 2:
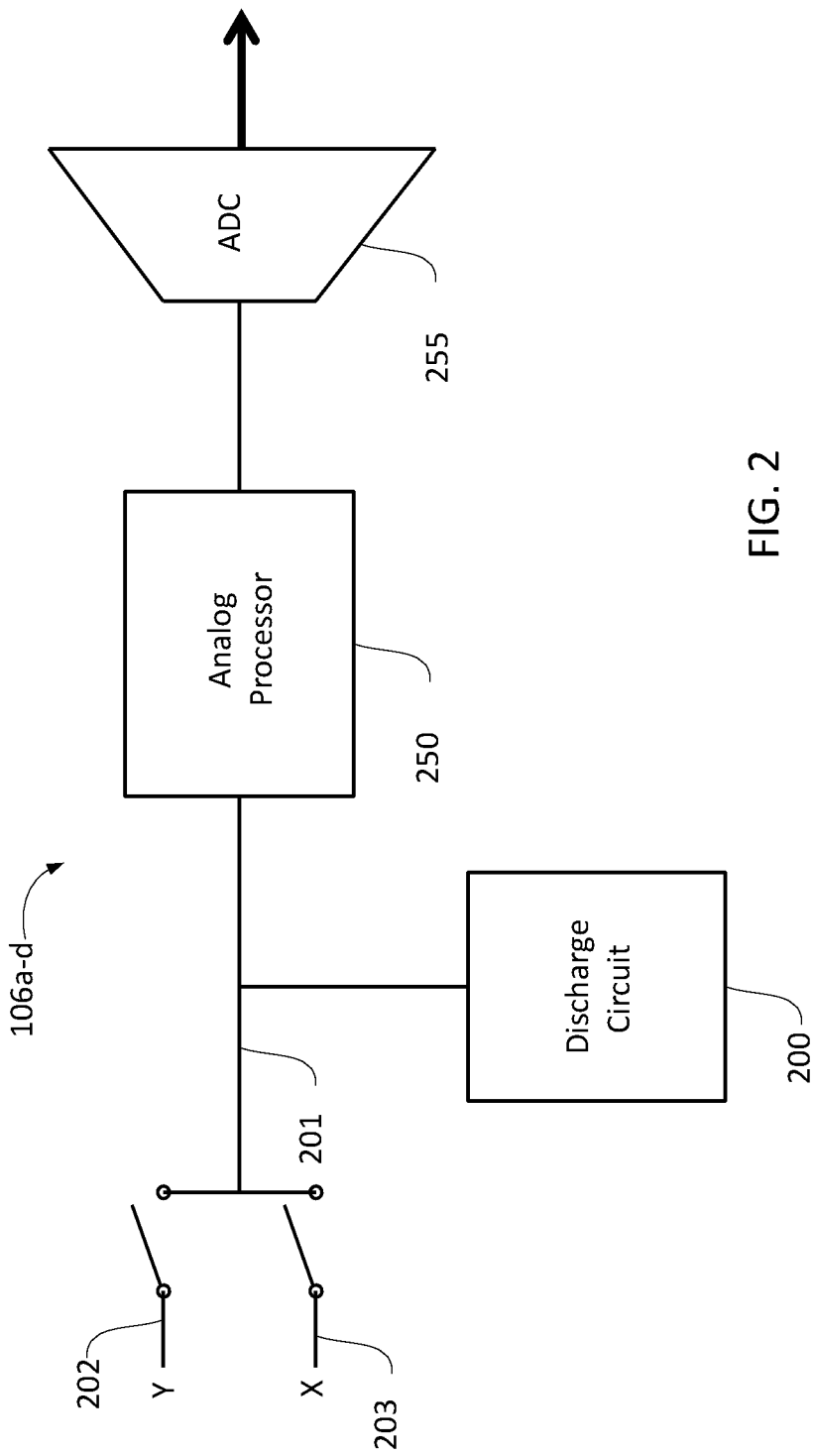
FIG. 2 is a schematic block diagram of an example channel of the electronic device of FIG. 1.

Referring now to FIG. 2, further details of the channels 106a-d are given. As shown, each channel 106a-d includes an X line and a Y line, one of which may be coupled to the channel at a time via a line 201 and switches 202, 203. When a given X or Y line is coupled to its respective channel so as to facilitate touch sensing proximate the given X or Y line, charge builds up on the line 201 due to the parasitic capacitance between the line 201 and ground.

An analog processor 250 is coupled to the line 201 to process the signal on the line as will be understood by those of skill in the art, and an analog to digital converter (ADC) 255 is coupled to the analog processor 250 to convert the processed signal to the digital domain for use by the digital processor 108 (of FIG. 1) described above. So as to prevent the false registering of touches or swipes, misinterpretation of taps as swipes, and inaccurate touch sensing, it is useful to discharge the charge in the parasitic capacitance on the line 201 before the signal on the line reaches the analog processor 250. Therefore, a discharge circuit 200 is coupled to the line 201, and serves to discharge the parasitic capacitance.

Figure 3:
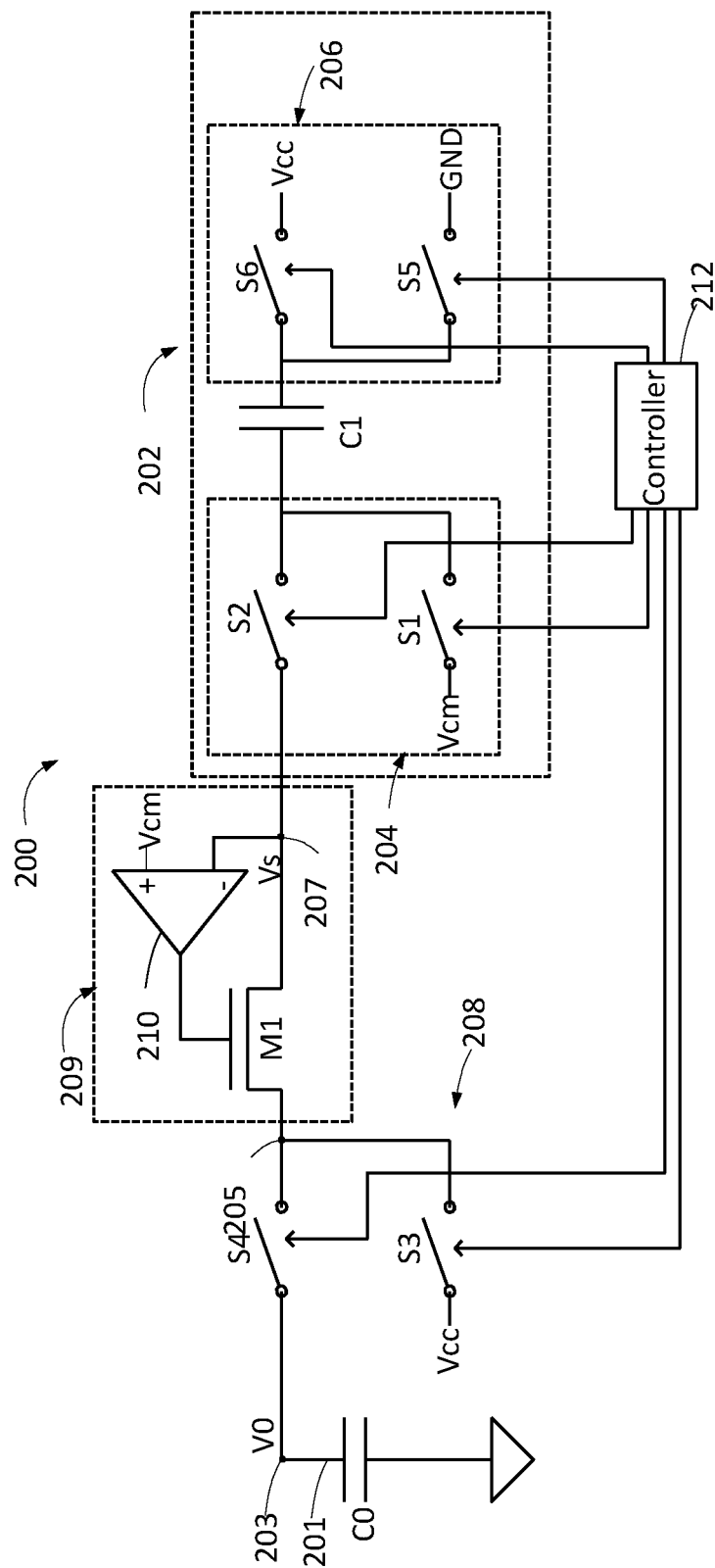
FIG. 3 is a schematic block diagram of the discharge circuit of FIG. 2.

The discharge circuit 200 will now be described with reference to FIG. 3. The discharge circuit 200 includes a switched circuit 208 having an input node 203 coupled to the line 201. The capacitor C0 is shown on the line 201 to represent the parasitic capacitance of the line 201. The switched circuit 208 includes a pair of switches S3, S4 that can couple the line 201 to a voltage regulator 209, or can couple the voltage regulator 209 to a power source Vcc. The voltage regulator circuit 209 is coupled in series between the output node 205 of the switched circuit 208 and the input node 207 of a switched capacitor circuit 202.

The voltage regulator circuit 209 illustratively includes an operational amplifier 210 having inputs coupled to a common mode voltage Vcm and to the input node 207 of the switched capacitor circuit 202, and an output coupled to the gate of a transistor M1. The transistor M1 has a source coupled to the switched circuit 208 at the output node 205 thereof, and a drain coupled to the switched capacitor circuit 202 at an input node 207 thereof. In operation, the voltage regulator 209 works to maintain the voltage Vs at the input node 207 to the switched capacitor circuit 202 to be equal to Vcm. In particular, the amplifier 210 compares the common mode voltage Vcm to the voltage Vs at the input node 207 to the switched capacitor circuit 202, and outputs a control signal to the gate of M1 based upon the difference between Vcm and Vs. The current sunk through the transistor M1 as a result of the control signal on the gate is proportional to the difference between Vcm and Vs, such that the transistor M1 does not permit the flow of current therethrough when Vcm and Vs are equal.

The switched capacitor circuit 202 includes a capacitor C1 having a capacitance that is smaller than the capacitance C0 of the line, and includes first and second switched circuits 204, 206. The first switched circuit 204 is coupled between the input node 207 and a first terminal of the capacitor C1, and the second switched circuit 206 is coupled to a second terminal of the capacitor C1. The first switched circuit 204 includes switches S1, S2 that can couple the first terminal of the capacitor C1 to either the input node 207 or to the common mode voltage Vcm, and the second switched circuit 206 includes switches S5, S6 that can couple the second terminal of the capacitor C1 to either the power supply Vcc or to ground GND.

Figure 4:
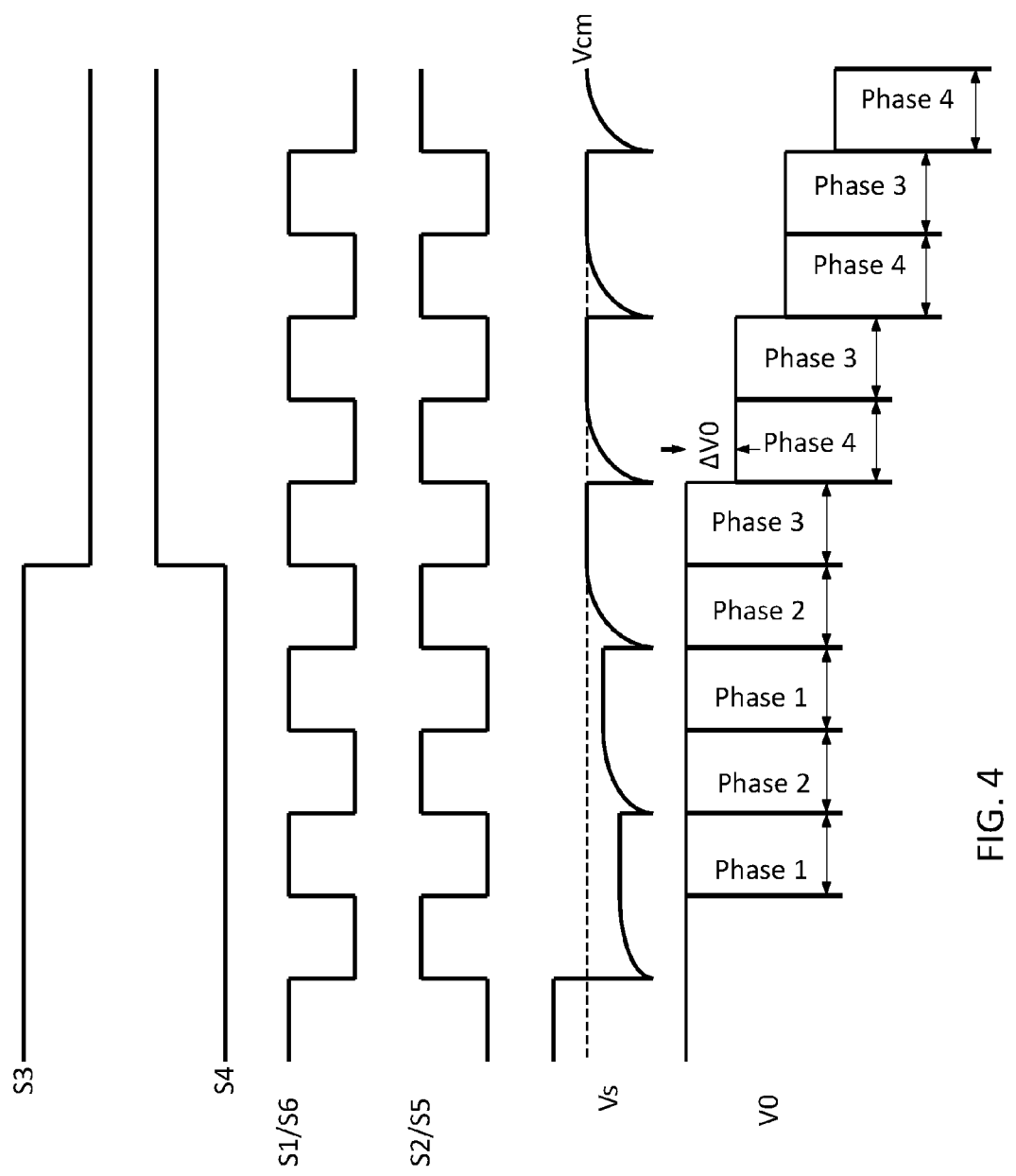
FIG. 4 is a timing diagram of the operation of the discharge circuit of FIG. 3.

A controller 212 is coupled to the switched circuit 208 and the switched capacitor circuit 202, and operates those circuits so as to discharge the charge on the line 201 due to parasitic capacitance. This operation will now be described in detail with reference to the timing diagram of FIG. 4.

In a first phase, the controller 212 operates the switches S1, S2, S5, S6 of the switched capacitor circuit 202 so as to charge the capacitor C1 by coupling the capacitor C1 between the common mode voltage Vcm and the power supply voltage Vcc. As shown in the timing diagram of FIG. 4, this is accomplished by closing the switches S1, S6 and opening the switches S2, S5.

Next, in a second phase, the controller 212 operates the switches S1, S2 so as to discharge the capacitor C1 by coupling the voltage regulator circuit 209 to the first terminal of the capacitor C1, and the second terminal of the capacitor C1 to ground GND. As shown in the timing diagram of FIG. 4, this is accomplished by closing the switches S2, S5 and opening the switches S1, S6.

It should be noted that during these first and second phases, the switch S3 is closed while the switch S4 is open. The purpose of these phases is to start the flow of current through the feedback loop between the transistor M1 and the operational amplifier 210. By charging the capacitor C1 and then discharging the capacitor C1, current is sunk through the transistor M1, thereby generating the voltage Vs.

A single performance of these first and second phases may not be sufficient to raise the voltage Vs to match the common mode voltage Vcm. Therefore, the first and second phases may be repeated, in order, until the voltage Vs at the input node 207 to the switched capacitor circuit 202 matches Vcm. As shown in the timing diagram of FIG. 5, the first and second phases are each performed twice, although it should be noted that in some applications, these phases may be performed but once, or may be performed more than twice. The controller 212 may simply perform the first and second phases a given number of times known to result in the voltage Vs matching Vcm, or may employ a comparison circuit to compare Vs to Vcm, and may perform additional instances of the first and second phases based upon Vs not being within a threshold of Vcm.

Next, a third phase is performed. In this third phase, the controller 212 operates the switches S1, S2, S5, S6 so as to charge the capacitor C1 by coupling the capacitor C1 between the common mode voltage Vcm and the power supply voltage Vcc. While the timing diagram of FIG. 4 indicates that the switches S1, S2, S5, S6 are in the same positions as during the first phase, during this third phase, the switches S3, S4 are in opposite positions to that of the first phase. That is, during the third phase, the switch S4 is closed while the switch S3 is open. This is done to minimize the switching of the switches S3, S4 to reduce charge injection to the capacitor C0. During the third phase, the charge on C0 can be represented mathematically as:

$$Q0=V0*C0$$

and the charge on C1 can be represented mathematically as:

$$Q1=(Vcm-Vcc)*C1$$

The total charge on the capacitors C0, C1 can thus be represented as:

$$Qtotal=Q0+Q1=V0*C0+(Vcm-Vcc)*C1$$

After the third phase, a fourth phase is performed. In this fourth phase, the controller 212 operates the switches S1, S2, S5, S6 so as to share charge between the line 201 and the capacitor C1 by coupling the voltage regulator circuit 209 in series between the capacitor C1 and the line 201, and to discharge the charge from the capacitor C1 and the line 201 by coupling the voltage regulator circuit 209 and capacitor C1 in series between the line 201 and ground GND. As shown in the timing diagram of FIG. 4, this is accomplished by closing the S2, S5 and opening the switches S1, S6. During the fourth phase, the voltage V0 on the line 201 is lowered by ΔV as a result of the parasitic capacitance on the line 201 being discharged.

During the fourth phase, the charge on the capacitor C0 can be represented mathematically as:

$$Q0=V0'*C0$$

and the charge on C1 can be represented mathematically as:

$$Q1=Vs*C1$$

The total charge on the capacitors C0, C1 can thus be represented as:

$$Qtotal=Q0+Q1=V0'*C0+Vs*C1$$

Due to charge conservation, the total charge during the third phase and during the fourth phase is equal. Setting these equal mathematically yields:

$$V0'*C0+Vs*C1=V0*C0+(Vcm-Vcc)*C1$$

Since V0 is the voltage on the line 201 due to the parasitic capacitance during the third phase, and since V0' is the voltage on the line 201 due to the parasitic capacitance during the fourth phase, the discharge voltage ΔV can therefore be represented as:

$$\Delta V=V0-V0'=(Vcc+Vs-Vcm)*C1/C0$$

The purpose of the third and fourth phases is to share the charge between the capacitors C0 and C1, and to then discharge that charge. To enable the sinking of current through the transistor M1, and thus the transfer of charge from the capacitor C0 to the capacitor C1, the capacitor C1 is charged in the third phase as described. The discharge of the capacitor C1 during the fourth phase sinks current through the transistor M1, transferring charge from the line 201 to the capacitor C0, and ultimately results in the discharging of the capacitor C0, and thus the lowering of the voltage V0.

As should be understood, performance of the third and fourth phases a single time may be insufficient to discharge the voltage V0 to a desired level. The third and fourth phases may therefore repeated until V0 is discharged to a reference voltage, such as (but not necessarily) ground. As shown in the timing diagram of FIG. 4, in an example, the third and fourth phases are repeated three times, although it should be noted that in some applications, these phases may be performed less than three times or more than three times. The controller 212 may repeat the third and fourth phases a given number of times known to be sufficient to discharge V0 to the desired level, or may utilize a comparison circuit to compare V0 to a reference voltage, and repeat the third and fourth phases until V0 matches or is less than the reference voltage. Alternatively, the controller 212 may compare the output of the ADC 255 (of FIG. 2) to a known value, and repeat the third and fourth phases until the output matches or is less than the reference value.

The discharge circuit 200 disclosed herein provides for the discharge of capacitances without the drawback of flicker noise caused by a transistor that sources, or generates, current. That is, the discharge circuit 200 lacks any transistors that source, or generate, current.

Figure 5:
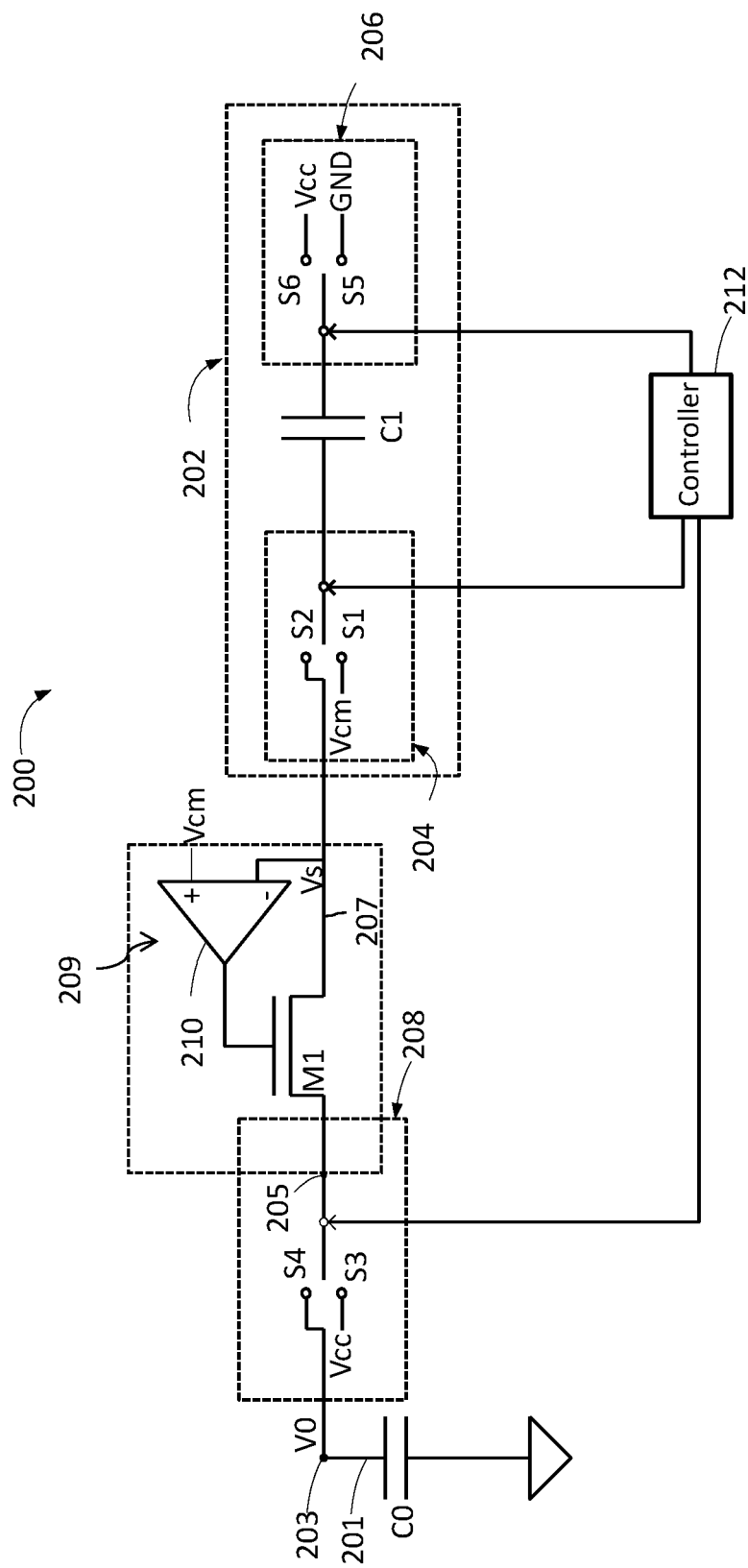
FIG. 5 is a schematic block diagram of an alternative configuration of the discharge circuit of FIG. 2.

Although the switches S1, S2, S3, S4, S5, S6 as shown in the switched circuit 208 and the switched capacitor circuit 202 are single pole single throw switches, it should be understood that other switches may be used. For example, as shown in FIG. 5, the switched circuit 208 and switched capacitor circuit 202 may instead employ single pole double throw switches. As shown, the switched circuit 208 includes a single pole double throw switch S3/S4 that provides the switched circuit 208 with the functionality of the switches S3, S4 as described above. As also shown, the switched capacitor circuit 202 includes single pole double throw switches S2/S1, S1/S2 that provide the switched capacitor circuit 202 with the functionality of the switches S1, S2 as described above.

While the disclosure has been described with respect to a limited number of embodiments, those skilled in the art, having benefit of this disclosure, will appreciate that other embodiments can be envisioned that do not depart from the scope of the disclosure as disclosed herein. Accordingly, the scope of the disclosure shall be limited only by the attached claims.

What is claimed is:

1. An electronic device, comprising:
   an input line coupled to a sense capacitance of a touch sensitive screen;
   a voltage regulator circuit having a supply input node and a regulated node;
   a capacitor having first and second terminals;
   a first switch circuit having inputs coupled to the regulated node of the voltage regulator circuit and to a common mode node, and an output coupled to the first terminal of the capacitor;
   a second switch circuit having inputs coupled to a power supply node and to a ground node, and an output coupled to the second terminal of the capacitor; and
   a third switch circuit having inputs coupled to the input line and to the power supply node, and an output coupled to the supply input node of the voltage regulator circuit.

2. The electronic device of claim 1, wherein the first switch circuit comprises a single pole double throw switch having inputs coupled to the regulated node of the voltage regulator circuit and to the common mode node, and an output coupled to the first terminal of the capacitor.

3. The electronic device of claim 1, wherein the first switch circuit comprises a first switch coupled between the regulated node of the voltage regulator circuit and the first terminal of the capacitor, and a second switch coupled between the common mode node and the first terminal of the capacitor.

4. The electronic device of claim 1, wherein the second switch circuit comprises a single pole double throw switch having inputs coupled to the power supply node and to the ground node, and an output coupled to the second terminal of the capacitor.

5. The electronic device of claim 1, wherein the second switch circuit comprises a first switch coupled between the power supply node and the second terminal of the capacitor, and a second switch coupled between the ground node and the second terminal of the capacitor.

6. The electronic device of claim 1, wherein the third switch circuit comprises a single pole double throw switch having inputs coupled to the input line and to the power supply node, and an output coupled to the supply input node of the voltage regulator circuit.

7. The electronic device of claim 1, wherein the third switch circuit comprises a first switch coupled between the input line and the voltage regulator circuit, and a second switch coupled between the power supply node and the supply input node of the voltage regulator circuit.

8. The electronic device of claim 1, wherein the voltage regulator circuit comprises:
an operational amplifier having a first input coupled to the common mode node, a second input coupled to the regulated node, and an output; and
a field effect transistor having a source terminal coupled to the supply input node, a drain terminal coupled to regulated node, and a gate terminal coupled to the output of the operational amplifier.

9. The electronic device of claim 1, further comprising a controller circuit configured to selectively actuate the first, second and third switch circuits.

10. The electronic device of claim 9, wherein the controller circuit operates:

in a first phase to control the first and second switch circuits to couple the first and second terminals of the capacitor to the common mode node and the power supply node, respectively;
in a second phase to control second and third switch circuits to couple the capacitor and voltage regulator circuit in series between the power supply node and the ground node;
in a third phase to control the first and second switch circuits to couple the first and second terminals of the capacitor to the common mode node and the power supply node, respectively; and
in a fourth phase to control the second and third switch circuits to couple the capacitor and voltage regulator circuit in series between the input line and the ground node.

11. The electronic device of claim 10, wherein the controller circuit further operates, before performing the third and fourth phases, by repeating the first and second phases if a voltage at the regulated node is less than a regulator threshold voltage.

12. The electronic device of claim 10, wherein the controller circuit further operates to repeat the first and second phases a plurality of times before proceeding to the third phase.

13. The electronic device of claim 10, wherein the controller circuit further operates to repeat the third and fourth phases until a voltage on the input line is less than a line threshold voltage.

14. The electronic device of claim 10, wherein the controller circuit further operates to repeat the third and fourth phases at least twice.

* * * * *